United States Patent
Oh et al.

(10) Patent No.: US 11,531,423 B2
(45) Date of Patent: Dec. 20, 2022

(54) TOUCH DISPLAY DEVICE, DRIVING CIRCUIT AND DRIVING METHOD THEREOF

(71) Applicant: LG DISPLAY CO., LTD., Seoul (KR)

(72) Inventors: Wooram Oh, Gyeongsangbuk-do (KR); KyungSu Ha, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/521,149

(22) Filed: Nov. 8, 2021

(65) Prior Publication Data
US 2022/0171517 A1    Jun. 2, 2022

(30) Foreign Application Priority Data
Nov. 30, 2020 (KR) .......... 10-2020-0164013

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0446* (2019.05)

(58) Field of Classification Search
CPC .............. G06F 3/04166; G06F 3/0446; G06F 2203/04111
See application file for complete search history.

(56) References Cited

U.S. PATENT DOCUMENTS

| | | | |
|---|---|---|---|
| 2014/0253491 A1* | 9/2014 | Kwon | G06F 3/0445 345/174 |
| 2014/0292679 A1* | 10/2014 | Kida | G06F 3/0412 345/173 |
| 2017/0160863 A1* | 6/2017 | Suzuki | G06F 3/0443 |
| 2020/0159385 A1* | 5/2020 | Chung | G06F 3/04166 |

* cited by examiner

*Primary Examiner* — Robin J Mishler
(74) *Attorney, Agent, or Firm* — Polsinelli PC

(57) ABSTRACT

A touch display device comprises a display panel in which a plurality of touch electrodes including a plurality of X-touch electrodes extending to a first direction and a plurality of Y-touch electrodes extending to a second direction, and a plurality of subpixels are disposed; and a touch driving circuit supplying a touch driving signal to the display panel, sensing a touch by detecting a touch sensing signal, and overlapping with a turn-off section of a first switch transmitting the touch sensing signal and a turn-on section of a second switch resetting the touch sensing signal transmitted through the first switch.

15 Claims, 13 Drawing Sheets

TOUCH DISPLAY DEVICE, DRIVING CIRCUIT AND DRIVING METHOD THEREOF

CROSS-REFERENCE TO RELATED APPLICATION

This application claims priority from Korean Patent Application No. 10-2020-0164013, filed on Nov. 30, 2020, which is hereby incorporated by reference in its entirety.

BACKGROUND

Field of the Disclosure

The present disclosure relates to a touch display device, a driving circuit and a driving method capable of reducing signal loss, and performing a touch sensing operation of a high frequency.

Description of the Background

With the development of the information society, there has been an increasing demand for a variety of types of image display devices. In this regard, a range of display devices, such as liquid crystal display device, electroluminescence display device, or quantum dot light emitting display device have recently come into widespread use.

In order to provide more diverse functions, such a display device provides a function of detecting a user's finger touch or a pen touch on a display panel and performing a signal processing based on the detected touch data.

As an example, a display device capable of detecting a touch includes a plurality of touch electrodes disposed or embedded in the display panel, and may detect a presence of a user's touch and touch coordinates on the display panel by driving these touch electrodes.

Such a display device capable of detecting a touch uses a touch driving signal for touch sensing. However, since a signal delay occurs due to impedance between the display device and a touch driving circuit, it is difficult to increase a touch driving frequency.

When the display panel is driven at high speed, the signal delay tends to be further increased due to noise generated in a transition period of the touch driving signal.

SUMMARY

Accordingly, the present disclosure provides a touch display device, a driving circuit and a driving method thereof capable of reducing signal loss and performing touch sensing operation using a touch driving signal of a high frequency by reducing a time delay of the touch driving signal.

In particular, the present disclosure provides a touch display device, a driving circuit and a driving method thereof capable of reducing signal loss and securing an integration time of the touch sensing signal by overlapping with a reset period of the touch driving circuit with an off period for blocking the touch sensing signal.

The problems to be described below according to the present disclosure is not limited to the problems mentioned above, and other problems that are not mentioned will be clearly understood by those skilled in the art from the following description.

A touch display device according to an aspect of present disclosure includes a display panel in which a plurality of touch electrodes including a plurality of X-touch electrodes extending to a first direction and a plurality of Y-touch electrodes extending to a second direction, and a plurality of subpixels are disposed; and a touch driving circuit for supplying a touch driving signal to the display panel, sensing a touch by detecting a touch sensing signal, and overlapping a turn-off section of a first switch for transmitting the touch sensing signal and a turn-on section of a second switch for resetting the touch sensing signal transmitted through the first switch.

In the touch display device according to an aspect of present disclosure, the touch driving circuit includes an integrating circuit for generating a sensing output signal by integrating a difference between the touch sensing signal and a reference voltage, and a sample-and-hold circuit for sampling the sensing output signal of the integrating circuit and maintaining the sampled voltage.

In the touch display device according to an aspect of present disclosure, the integrating circuit includes an operational amplifier to which a reference voltage is supplied to a non-inverting input terminal, a feedback capacitor connected between an inverting input terminal and an output terminal of the operational amplifier, and the second switch connected in parallel with the feedback capacitor.

In the touch display device according to an aspect of present disclosure, the first switch is connected to the inverting input terminal or the non-inverting input terminal of the operational amplifier according to a turn-on or turn-off operation of the second switch.

In the touch display device according to an aspect of present disclosure, the first switch is connected to the inverting input terminal of the operational amplifier during a turn-on section of the second switch.

In the touch display device according to an aspect of present disclosure, a section in which the first switch is connected to the inverting input terminal of the operational amplifier and the second switch is turned on includes a reset section of the integrating circuit and a time delay section in which the touch sensing signal is received according to the touch driving signal.

In the touch display device according to an aspect of present disclosure, the first switch is disconnected to the non-inverting input terminal of the operational amplifier during the second switch is turned on.

In the touch display device according to an aspect of present disclosure, a section in which the first switch is disconnected from the non-inverting input terminal of the operational amplifier and the second switch is turned on includes a reset section of the integrating circuit and a time delay section in which the touch sensing signal is received according to the touch driving signal.

In the touch display device according to an aspect of present disclosure, a time interval of the turn-off section of the first switch is different from a time interval of the turn-on section of the second switch, and the turn-off section of the first switch is overlapped with a part of the turn-on section of the second switch.

A driving circuit of a touch display device for sensing a touch by supplying a touch driving signal to a display panel and detecting a touch sensing signal according to an aspect of present disclosure includes a first switch for transmitting the touch sensing signal, an integrating circuit for generating a sensing output signal by integrating a difference between the touch sensing signal and a reference voltage, and a sample-and-hold circuit for sampling the sensing output signal of the integrating circuit and maintaining the sampled voltage, wherein a turn-on section of a second switch for resetting the integrating circuit is overlapped with a turn-off section of the first switch.

A driving method of a touch display device for sensing a touch by supplying a touch driving signal to a display panel and detecting a touch sensing signal according to an aspect of present disclosure includes supplying a touch driving signal in a form of a pulse to the display panel, transmitting the touch sensing signal generated in the display panel to the touch driving circuit, and overlapping a turn-off section of a first switch for transmitting the touch sensing signal to the touch driving circuit and a turn-on section of a second switch for resetting the touch sensing signal charged in the touch driving circuit.

According to aspects of the present disclosure, it is possible to provide a touch display device, a driving circuit and a driving method thereof capable of reducing signal loss and performing touch sensing operation using a touch driving signal of a high frequency by reducing a time delay of the touch driving signal.

In addition, according to aspects of the present disclosure, it is possible to provide a touch display device, a driving circuit and a driving method thereof capable of reducing signal loss and securing an integration time of the touch sensing signal by overlapping a reset period of the touch driving circuit with an off period for blocking the touch sensing signal.

The effects of the aspects disclosed in the present disclosure are not limited to the above mentioned effects. In addition, the aspects disclosed in the present disclosure may cause another effect not mentioned above, which will be clearly understood by those skilled in the art from the following description.

DESCRIPTION OF DRAWINGS

The accompanying drawings, which are included to provide a further understanding of the disclosure and are incorporated in and constitute a part of the disclosure, illustrate aspect(s) of the disclosure and together with the description serve to explain the principle of the disclosure.

In the accompanying drawings.

DETAILED DESCRIPTION

Figure 1:
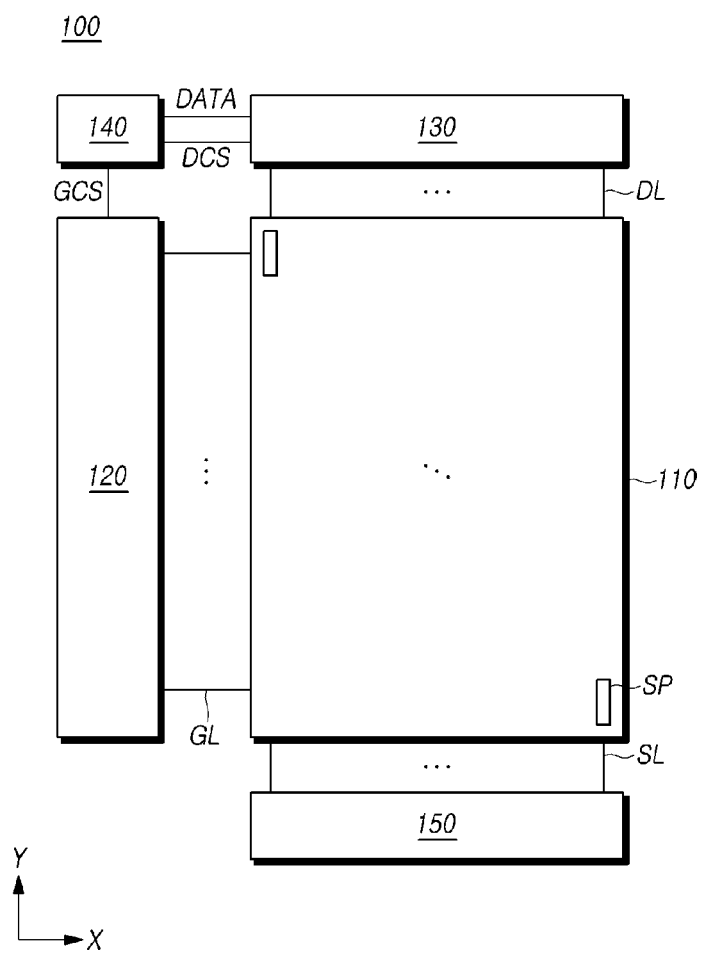
FIG. 1 illustrates a schematic diagram of a touch display device according to aspects of the present disclosure.

The advantages and features of the present disclosure and methods of the realization thereof will be apparent with reference to the accompanying drawings and detailed descriptions of the aspects. The present disclosure should not be construed as being limited to the aspects set forth herein and may be embodied in a variety of different forms. Rather, these aspects are provided so that the present disclosure will be thorough and complete, and will fully convey the scope of the present disclosure to those having ordinary knowledge in the technical field. The scope of the present disclosure shall be defined by the appended claims.

The shapes, sizes, ratios, angles, numbers, and the like, inscribed in the drawings to illustrate exemplary aspects are illustrative only, and the present disclosure is not limited to the aspects illustrated in the drawings. Throughout this document, the same reference numerals and symbols will be used to designate the same or like components. In the following description of the present disclosure, detailed descriptions of known functions and components incorporated into the present disclosure will be omitted in the situation in which the subject matter of the present disclosure may be rendered unclear thereby. It will be understood that the terms "comprise", "include", "have", and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of a component, it shall be understood that an error range is included therein, even in the situation in which there is no explicit description thereof.

When spatially relative terms, such as "on", "above", "under", "below", and "on a side of", are used herein for descriptions of relationships between one element or component and another element or component, one or more intervening elements or components may be present between the one and other elements or components, unless a term, such as "directly", is used.

When temporally relative terms, such as "after", "subsequent", "following", and "before" are used to define a temporal relationship, a non-continuous case may be included unless the term "immediately" or "directly" is used.

In descriptions of signal transmission, such as "a signal is sent from node A to node B", a signal may be sent from node A to node B via another node unless the term "immediately" or "directly" is used.

In addition, terms, such as "first" and "second" may be used herein to describe a variety of components. It should be understood, however, that these components are not limited by these terms. These terms are merely used to discriminate one element or component from other elements or components. Thus, a first component referred to as first hereinafter may be a second component within the spirit of the present disclosure.

The features of exemplary aspects of the present disclosure may be partially or entirely coupled or combined with each other and may work in concert with each other or may operate in a variety of technical methods. In addition, respective exemplary aspects may be carried out independently or may be associated with and carried out in concert with other aspects.

Hereinafter, a variety of aspects will be described in detail with reference to the accompanying drawings.

FIG. 1 illustrates a schematic diagram of a touch display device according to aspects of the present disclosure.

Referring to FIG. 1 the touch display device 100 according to aspects of the present disclosure may include a display panel 110, a gate driving circuit 120, a data driving circuit 130, a timing controller 140 and a touch driving circuit 150 to detect a touch on the display panel 110.

A plurality of gate lines GL and a plurality of data lines DL are disposed in the display panel 110, and a plurality of subpixels SP are disposed in areas in which the gate lines GL intersect the data lines DL.

In addition, a plurality of touch electrodes may be disposed on or within the display panel 110, and a plurality of sensing lines SL electrically connecting the touch electrodes and the touch driving circuit 150 may be disposed in the display panel 110.

Describing a display driving operation in the touch display device 100, the gate driving circuit 120 controls the driving timing of the subpixels SP disposed in the display panel 110. In addition, the data driving circuit 130 supplies a data voltage corresponding to image data to the subpixels SP, so that the subpixels SP are displaying an image by illuminating luminous intensities corresponding to grayscale levels of the image data.

Specifically, the gate driving circuit 120 is controlled by the timing controller 140, and controls the driving timing of the plurality of subpixels SP by sequentially supplying scan signals to the plurality of gate lines GL disposed in the display panel 110.

The gate driving circuit 120 may include one or more gate driving integrated circuits (GDIC), which may be disposed on one or both sides of the display panel 110, depending on the driving scheme. Alternatively, the gate driving circuit 120 may be implemented with a gate-in-panel (GIP) structure directly embedded in a bezel area of the display panel 110.

The data driving circuit 130 receives digital image data from the timing controller 140, and converts the received digital image data into an analog data voltage. In addition, the data driving circuit 130 supplies the data voltage to the respective data lines DL at time which the scan signals are supplied through the gate lines GL, so that the respective subpixels SP display luminous intensities according to the data voltage.

The data driving circuit 130 may include one or more source driving integrated circuits (SDICs).

The timing controller 140 supplies a variety of control signals to the gate driving circuit 120 and the data driving circuit 130, and controls the operations of the gate driving circuit 120 and the data driving circuit 130.

The timing controller 140 controls the gate driving circuit 120 to supply the scan signals at time according to timing realized by respective frames, converts source image data received from an external source into an image data DATA with a format readable by the data driving circuit 130, and supplies the converted image data DATA to the data driving circuit 130.

The timing controller 140 also receives a variety of timing signals, including a vertical synchronization signal, a horizontal synchronization signal, an input data enable signal, a clock signal, and the like, from the external source (e.g. a host system).

The timing controller 140 may generate a variety of control signals DCS, GCS using the variety of timing signals received from the external source, and supply the variety of control signals DCS, GCS to the gate driving circuit 120 and the data driving circuit 130.

For example, the timing controller 140 generates a variety of gate control signals GCS, including a gate start pulse signal, a gate shift clock signal, a gate output enable signal, and the like, to control the gate driving circuit 120.

Here, the gate start pulse signal is used to control the operation start timing of one or more gate driving integrated circuits in the gate driving circuit 120. The gate shift clock signal is a clock signal commonly supplied to the one or more gate driving integrated circuits to control the shift timing of the scan signals. The gate output enable signal designates timing information of the one or more gate driving integrated circuits.

In addition, the timing controller 140 generates a variety of data control signals DCS, including a source start pulse signal, a source sampling clock signal, a source output enable signal, and the like, to control the data driving circuit 130.

Here, the source start pulse signal is used to control the data sampling start timing of one or more source driving integrated circuits in the data driving circuit 130. The source sampling clock signal is a clock signal for controlling the sampling timing of data voltage in each of the source driving integrated circuits. The source output enable signal controls the output timing of the data driving circuit 130.

The touch display device 100 may further include a power management integrated circuit for supplying various types of voltage or current to the display panel 110, the gate driving circuit 120, the data driving circuit 130, and the like, or controls various types of voltage or current to be supplied to the same.

The subpixels SP are defined by the intersections of the gate lines GL and the data lines DL. Liquid crystals or light-emitting elements may be disposed in the subpixels SP, depending on the type of the touch display device 100.

For example, in a case in which the touch display device 100 is a liquid crystal display device, the touch display device 100 includes a light source device, such as a backlight unit, to illuminate the display panel 110, and liquid crystals are disposed in the subpixels SP of the display panel 110. In addition, the touch display device 100 may display luminous intensities and an image data by adjusting the alignment of the liquid crystals using electromagnetic fields generated in response to the data voltage supplied to the subpixels SP.

In the case of a liquid crystal display device, the display panel 110 includes a liquid crystal layer formed between two substrates, and it may be operated in any known mode such as Twisted Nematic (TN) mode, Vertical Alignment (VA) mode, In Plane Switching (IPS) mode, or Fringe Field Switching (FFS) mode. On the other hand, in the case of an electroluminescent display device, the display panel 110 may be implemented in a top emission type, a bottom emission type, or a dual emission type.

In addition, the touch display device 100 according to aspects of the present disclosure may detect a user's touch on the display panel 110 using the touch electrodes TE included in the display panel 110, and the touch driving circuit 150.

Figure 2:
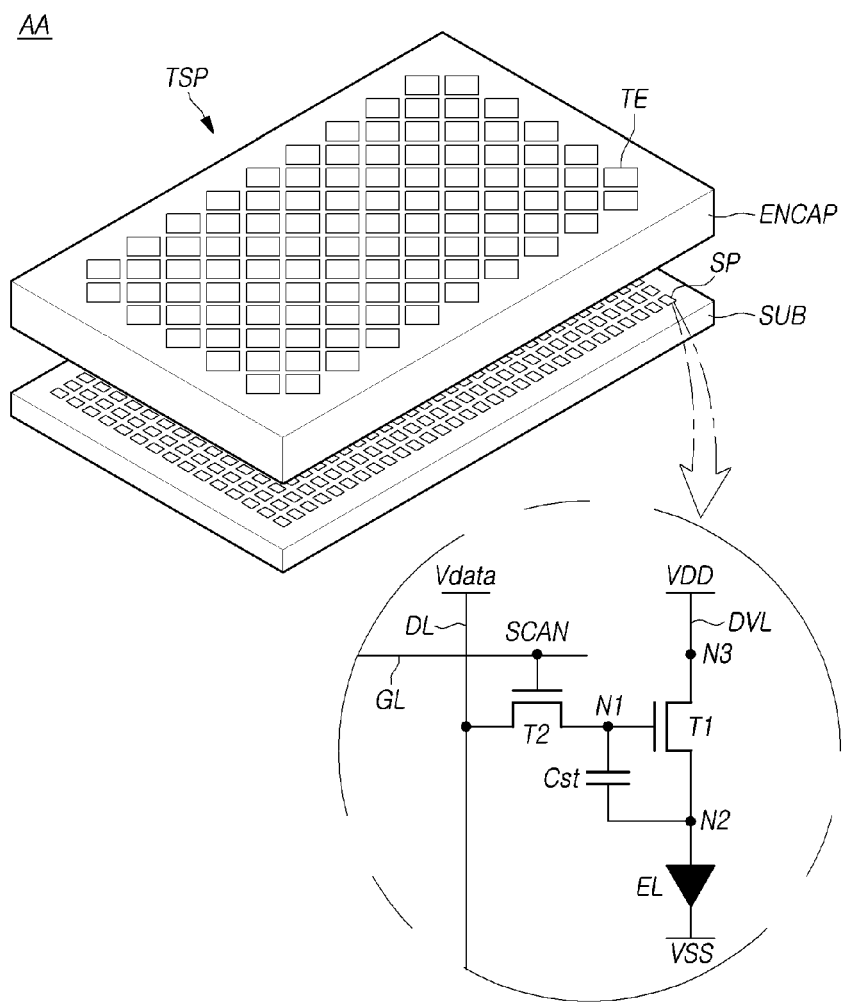
FIG. 2 illustrates a structure in which a touch screen panel is embedded in a display panel of a touch display device according to an aspect of the present disclosure.

FIG. 2 illustrates a structure in which a touch screen panel is embedded in a display panel of a touch display device according to aspects of the present disclosure.

Referring to FIG. 2, a plurality of subpixels SP may be disposed on a substrate SUB in an active area AA of the display panel 110 in the touch display device 100 according to aspects of the present disclosure.

Each subpixel SP may include a light emitting diode EL, a first transistor T1 for driving the light emitting diode EL, a second transistor T2 for transmitting a data voltage Vdata to a first node N1 of the first transistor T1, and a storage capacitor Cst for maintaining a constant voltage for one frame.

The first transistor T1 may include a first node N1 to which a data voltage Vdata may be supplied through the second transistor T2, a second node N2 electrically connected to the light emitting diode EL, and a third node N3 to which a driving voltage VDD is supplied from a driving voltage line DVL. The first node N1 may be a gate node, the second node N2 may be a source node or a drain node, and the third node N3 may be a drain node or a source node. The first transistor T1 may also be referred to as a driving transistor for driving the light emitting diode EL.

The light emitting diode EL may include a first electrode (e.g., an anode electrode), a light emitting layer, and a second electrode (e.g., a cathode electrode). The first electrode may be electrically connected to the second node N2 of the first transistor T1, and the second electrode may be supplied with a base voltage VSS.

The light emitting layer of the light emitting diode EL may be an organic light emitting layer containing an organic material. In this case, the light emitting diode EL may be an organic light emitting diode.

The second transistor T2 may be controlled to be turned on and off by a scan signal SCAN supplied through a gate line GL, and may be electrically connected between the first node N1 of the first transistor T1 and the data line DL. The second transistor T2 may also be referred to as a switching transistor.

When the second transistor T2 is turned on by the scan signal SCAN, a data voltage Vdata supplied through the data line DL is transmitted to the first node N1 of the first transistor T1.

The storage capacitor Cst may be electrically connected between the first node N1 and the second node N2 of the first transistor T1.

Each subpixel SP may have a 2T1C structure including two transistors T1, T2 and one capacitor Cst, and may further include one or more transistors, or may further include one or more capacitors in some cases.

The storage capacitor Cst may be an external capacitor which is intentionally designed to be provided outside the first transistor T1, instead of a parasitic capacitor which is provided between the first node N1 and the second node N2 of the first transistor T1.

Each of the first transistor T1 and the second transistor T2 may be an n-type transistor or a p-type transistor.

On the other hand, circuit elements such as a light emitting diode EL, two or more transistors T1, T2, and one or more capacitors Cst, may be disposed in the display panel 110. Since the circuit elements are vulnerable to external moisture or oxygen, an encapsulation layer ENCAP for preventing external moisture or oxygen from penetrating into the circuit elements may be disposed in the display panel 110.

The encapsulation layer ENCAP may be formed as a single layer or as multiple layers. For example, when the encapsulation layer ENCAP is formed as multiple layers, the encapsulation layer ENCAP may include one or more inorganic encapsulation layers and one or more organic encapsulation layers. For example, the encapsulation layer ENCAP may be configured to include a first inorganic encapsulation layer, an organic encapsulation layer, and a second inorganic encapsulation layer. Here, the organic encapsulation layer may be located between the first inorganic encapsulation layer and the second inorganic encapsulation layer. However, the configuration of the encapsulation layer is not limited thereto.

The first inorganic encapsulation layer may be formed on the second electrode (e.g., a cathode electrode) to be closest to the light emitting diode EL. The first inorganic encapsulation layer may include an inorganic insulating material that enables low temperature deposition, such as silicon nitride (SiNx), silicon oxide (SiOx), silicon oxynitride (SiON), aluminum oxide ($Al_2O_3$), or the like. Accordingly, since the first inorganic encapsulation layer is deposited in a low temperature atmosphere, the first inorganic encapsulation layer may prevent the light emitting layer (organic light emitting layer), which is vulnerable to a high temperature atmosphere, from being damaged during the deposition process.

The organic encapsulation layer may have a smaller area than the first inorganic encapsulation layer, and may be formed such that both ends of the first inorganic encapsulation layer are exposed. The organic encapsulation layer may serve as a buffer for relieving the stress between the respective layers due to bending of the touch display device 100, and may enhance the planarization performance. The organic encapsulation layer may include an organic insulating material, such as an acrylic resin, an epoxy resin, polyimide, polyethylene, silicon oxycarbide (SiOC), or the like.

The second inorganic encapsulation layer may be formed on the organic encapsulation layer to cover the upper surface and the side surface of each of the organic encapsulation layer and the first inorganic encapsulation layer. As a result, the second inorganic encapsulation layer may reduce or prevent external moisture or oxygen from penetrating into the first inorganic encapsulation layer and the organic encapsulation layer. The second inorganic encapsulation layer may include an inorganic insulating material such as silicon nitride (SiNx), silicon oxide (SiOx), silicon oxynitride (SiON), aluminum oxide ($Al_2O_3$), or the like.

The touch screen panel TSP may be on the encapsulation layer ENCAP in the touch display device 100 according to aspects of the present disclosure. For example, a plurality of touch electrodes TE constituting the touch screen panel TSP may be disposed on the encapsulation layer ENCAP in the touch display device 100.

The touch display device 100 may sense a touch by a mutual-capacitance scheme or a self-capacitance scheme, as a capacitance based touch sensing scheme.

In case of a touch sensing scheme based on mutual-capacitance, a plurality of touch electrodes TE may be classified as touch driving electrodes which is supplied touch driving signals through touch driving lines, and touch sensing electrodes which supplies touch sensing signals through touch sensing lines and forms capacitances with the touch driving electrodes. Here, the touch driving lines and the touch sensing lines may be referred to as touch lines. Also, the touch driving signals and the touch sensing signals may be referred to as touch signals.

In case of the touch sensing scheme based on mutual-capacitance, the touch presence and the touch coordinate may be detected based on a change of mutual-capacitance formed between the touch driving electrode and the touch sensing electrode according to a presence of a pointer such as a finger, a pen, or the like.

In case of the touch sensing scheme based on self-capacitance, each touch electrode serves as both the touch driving electrode and the touch sensing electrode. That is, a touch driving signal is supplied to a touch electrode TE through a touch line, and a touch sensing signal generated in the touch electrode, to which the touch driving signal is supplied, is transmitted through the same touch line. Accordingly, in case of the touch sensing scheme based on self-capacitance, there is no distinction between the touch driving electrode and the touch sensing electrode and no distinction between the touch driving line and the touch sensing line.

In case of the touch sensing scheme based on self-capacitance, the touch presence and a touch coordinate may be detected based on a change in capacitance formed between a pointer such as a finger, a pen, or the like, and a touch electrode TE.

Thus, the touch display device 100 may sense a touch by the touch sensing scheme based on mutual-capacitance or the touch sensing scheme based on self-capacitance.

Figure 3:
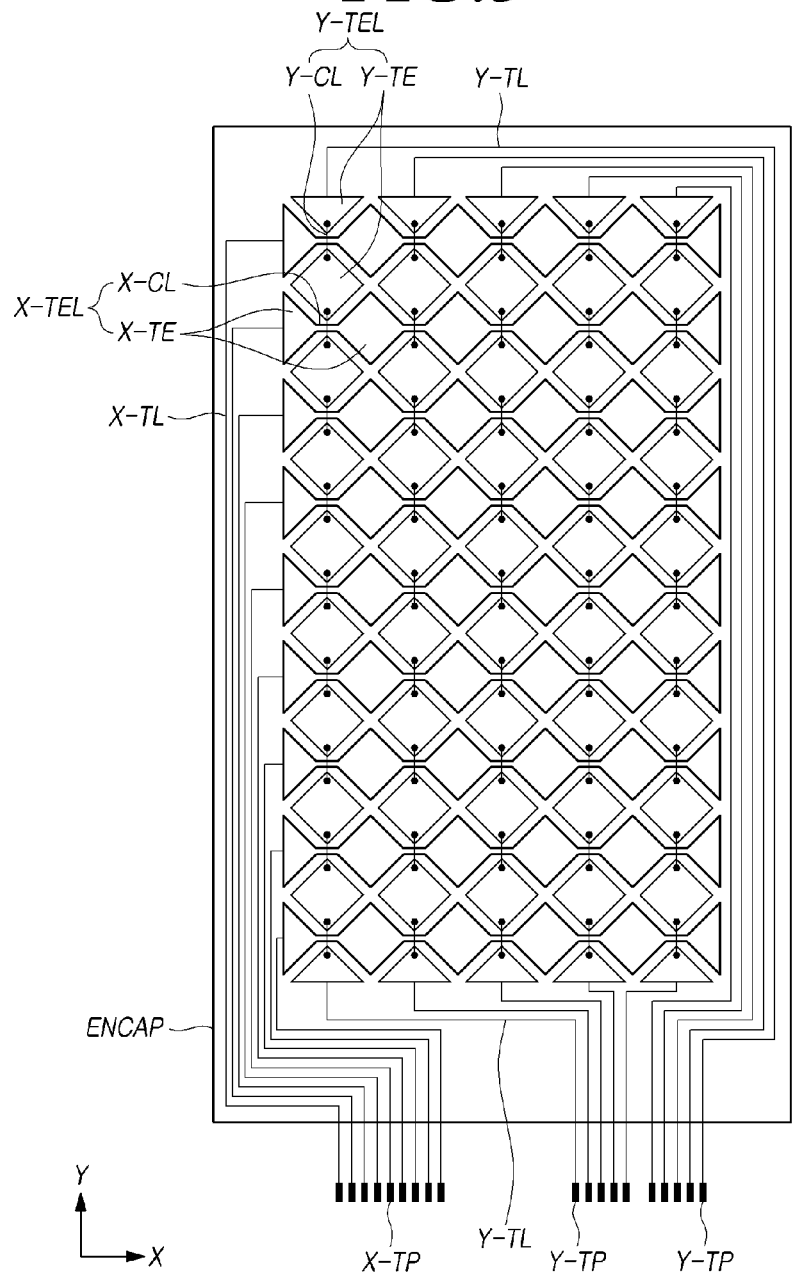
FIG. 3 illustrates a touch sensing structure based on mutual-capacitance in a touch display device according to aspects of the present disclosure.

FIG. 3 illustrates a touch sensing structure based on mutual-capacitance in a touch display device according to aspects of the present disclosure.

Referring to FIG. 3, the touch sensing structure based on mutual-capacitance in the touch display device 100 according to aspects of the present disclosure may include a plurality of X-touch electrode lines X-TEL and a plurality of Y-touch electrode lines Y-TEL. Here, the plurality of X-touch electrode lines X-TEL and the plurality of Y-touch electrode lines Y-TEL may be located on the encapsulation layer ENCAP.

A plurality of X-touch electrode lines X-TEL may be disposed in a first direction, and a plurality of Y-touch electrode lines Y-TEL may be disposed in a second direction different from the first direction.

In the present specification, the first direction and the second direction may be relatively different directions. For example, the first direction may be an x-axis direction and the second direction may be a y-axis direction. Conversely, the first direction may be the y-axis direction and the second direction may be the x-axis direction. Further, the first direction and the second direction may be orthogonal to each other, but may not be orthogonal to each other.

Each X-touch electrode line X-TEL may be composed of a plurality of electrically connected X-touch electrodes X-TE, and each Y-touch electrode line Y-TEL may be composed of a plurality of electrically connected Y-touch electrodes Y-TE.

Here, the plurality of X-touch electrodes X-TE and the plurality of Y-touch electrodes Y-TE correspond to a plurality of touch electrodes TE having different roles (functions) respectively. For example, the plurality of X-touch electrodes X-TE constituting the X-touch electrode line X-TEL may be touch driving electrodes, and the plurality of Y-touch electrodes Y-TE constituting the Y-touch electrode line Y-TEL may be touch sensing electrodes. In this case, the plurality of X-touch electrode lines X-TEL will correspond to a plurality of touch driving electrode lines, and the plurality of Y-touch electrode lines Y-TEL will correspond to a plurality of touch sensing electrode lines.

Conversely, the plurality of X-touch electrodes X-TE constituting the plurality of X-touch electrode lines X-TEL may be touch sensing electrodes, and the plurality of Y-touch electrodes Y-TE constituting the plurality of Y-touch electrode lines Y-TEL may be touch driving electrodes. In this case, the plurality of X-touch electrode lines X-TEL will correspond to a plurality of touch sensing electrode lines, and the plurality of Y-touch electrode lines Y-TEL will correspond to a plurality of touch driving electrode lines.

A touch sensor metal for touch sensing may include a plurality of touch routing lines TL in addition to the plurality of X-touch electrode lines X-TEL and the plurality of Y-touch electrode lines Y-TEL.

The plurality of touch routing lines TL may include at least one X-touch routing line X-TL connected to the plurality of X-touch electrode lines X-TEL, and at least on Y-touch routing line Y-TL connected to the plurality of Y-touch electrode lines Y-TEL.

Each of the plurality of X-touch electrode lines X-TEL may include one or more X-touch electrode connecting lines X-CL for electrically connecting the plurality of X-touch electrodes X-TE arranged in the same row (or column). The X-touch electrode connecting line X-CL for connecting two adjacent X-touch electrodes X-TE may be a metal integrated with two adjacent X-touch electrodes X-TE, or may be a metal connected with two adjacent X-touch electrodes X-TE through a contact hole.

Each of the plurality of Y-touch electrode lines Y-TEL may include one or more Y-touch electrode connecting lines Y-CL for electrically connecting the plurality of Y-touch electrodes Y-TE arranged in the same column (or row). The Y-touch electrode connecting line Y-CL for connecting two adjacent Y-touch electrodes Y-TE may be a metal integrated with two adjacent Y-touch electrodes Y-TE, or may be a metal connected with two adjacent Y-touch electrodes Y-TE through a contact hole.

The X-touch electrode connecting line X-CL and the Y-touch electrode connecting lines Y-CL may intersect in an area (a touch electrode line intersection area) where the X-touch electrode line X-TEL and the Y-touch electrode line Y-TEL are intersected with.

When the X-touch electrode connecting line X-CL intersect with the Y-touch electrode connecting line Y-CL in the touch electrode line intersection area, the X-touch electrode may connect line X-CL and the Y-touch electrode may connect line Y-CL to be located in different layers from each other. Accordingly, in order that the plurality of X-touch electrode lines X-TEL and the plurality of Y-touch electrode lines Y-TEL may intersect each other, the plurality of X-touch electrodes X-TE, the plurality of X-touch electrode connecting lines X-CL, the plurality of Y-touch electrodes Y-TE, and the plurality of Y-touch electrode connecting lines Y-CL may be located at two or more layers.

Each of the X-touch electrode lines X-TEL may be electrically connected to corresponding X-touch pad X-TP through one or more X-touch routing lines X-TL. For example, the outermost X-touch electrode X-TE among the plurality of X-touch electrodes X-TE included in a X-touch electrode line X-TEL, may be electrically connected to the corresponding X-touch pad X-TP through the X-touch routing line X-TL.

Each of the Y-touch electrode lines Y-TEL may be electrically connected to corresponding Y-touch pad Y-TP through one or more Y-touch routing lines Y-TL. For example, the outermost Y-touch electrode Y-TE among the plurality of Y-touch electrodes Y-TE included in a Y-touch electrode line Y-TEL, may be electrically connected to the corresponding Y-touch pad Y-TP through the Y-touch routing line Y-TL.

Figure 4:
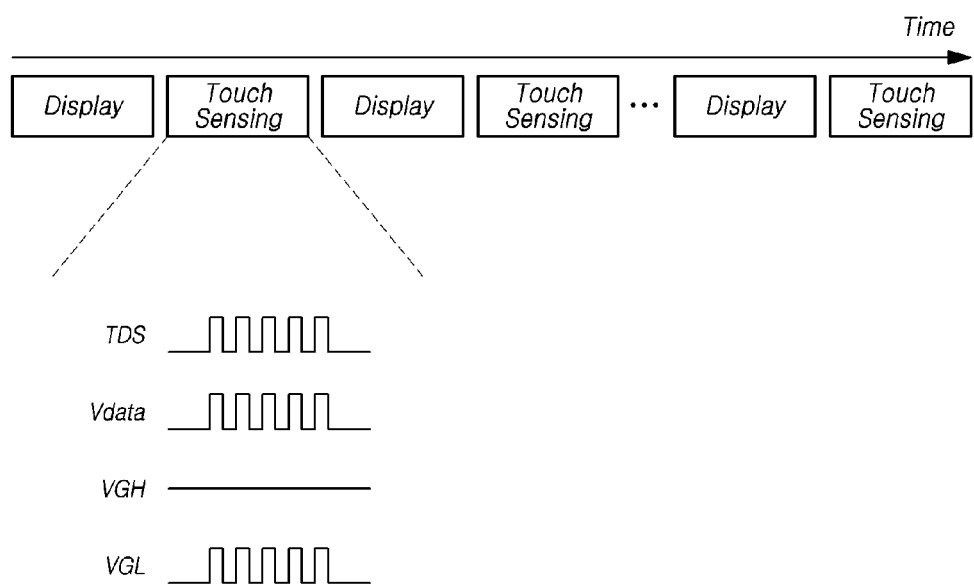
FIG. 4 illustrates a timing diagram of a display driving operation and a touch sensing operation of the touch display device according to aspects of the present disclosure, especially a case in which the display driving operation and the touch sensing operation are performed in different periods of time.

FIG. 4 illustrates a timing diagram of a display driving operation and a touch sensing operation in the touch display device according to aspects of the present disclosure, especially a case in which the display driving operation and the touch sensing operation are performed in different periods of time.

Referring to FIG. 4, the touch display device 100 according to aspects of the present disclosure may perform the touch sensing operation by driving the touch electrodes TE of the touch display panel 110 in time periods (e.g., blank periods) between display driving periods, e.g. in time periods where no image is displayed and/or time periods and/or in time periods where image displaying is been prepared but not performed.

For example, the touch display device 100 may perform the touch sensing operation in a vertical blank period within a single image frame. Alternatively, the touch sensing operation may be performed in some of a plurality of horizontal blank periods within a single image frame.

When common electrodes of the touch display panel 110 are used as the touch electrodes TE, a common voltage may be supplied to the touch electrodes TE in display driving periods, while touch driving signals TDS may be supplied to the touch electrodes TE in touch sensing periods.

The touch driving signals TDS may be a pulse voltage signal of which the magnitude changes over time.

Since the display driving operation is not performed in the touch sensing periods, electrodes and signal lines for the display driving operation may have no voltage supplied thereto or be in a constant voltage state (e.g., gate high voltage VGH). Thus, capacitances may be generated between the touch electrodes TE to which the touch driving signals TDS are supplied, and the other signal lines, such as the gate lines GL and the data lines DL. Due to such capacitance, the ability to detect the touch sensing signal may be degraded.

To prevent capacitances between the touch electrodes TE and the other lines, such as the gate lines GL and the data lines DL, a signal having the same voltage and phase as the touch driving signal TDS supplied to the touch electrodes TE may be supplied to the gate lines GL or the data lines DL during the touch sensing periods.

That is, as illustrated in FIG. 4, a data voltage Vdata having the same voltage and phase as the touch driving signal TDS may be supplied to the data lines DL. In addition, since a gate low voltage VGL is supplied to the gate lines GL during the touch sensing periods, a gate low voltage VGL signal having the same voltage and phase as the touch driving signal TDS may be supplied to the gate lines GL.

As described above, it is possible to prevent capacitances between the touch electrodes TE and the signal lines, and improve the ability to detect the touch sensing signals TSS by supplying the signal having the same voltage and phase as the touch driving signal TDS to the gate lines GL or the data lines DL during the touch sensing periods.

Alternatively, the touch display device 100 according to aspects of the present disclosure may simultaneously perform the display driving operation and the touch sensing operation.

Figure 5:
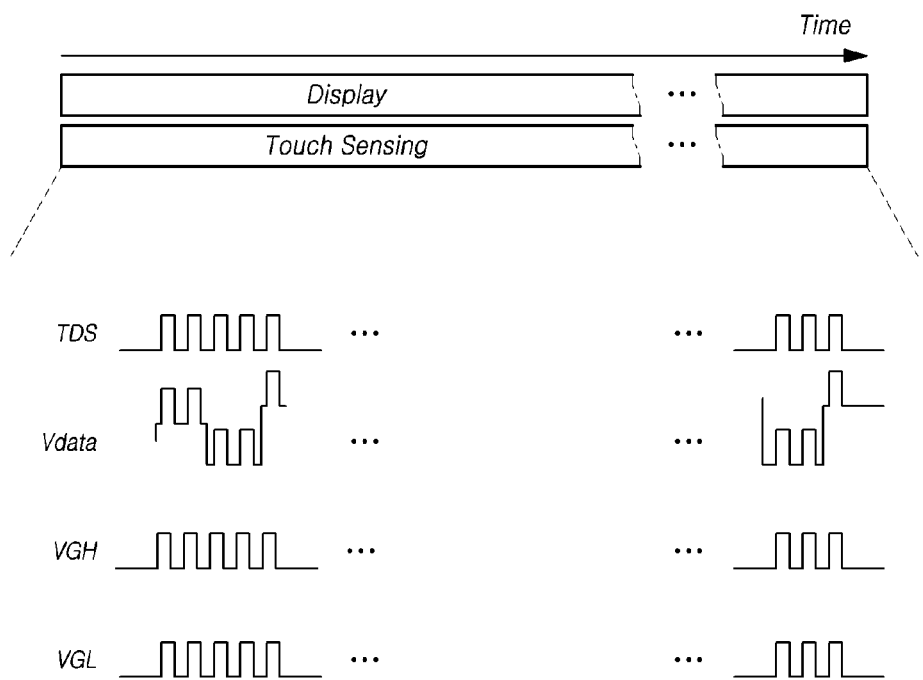
FIG. 5 illustrates a timing diagram in which the display driving operation and the touch sensing operation are simultaneously performed in the touch display device according to aspects of the present disclosure.

FIG. 5 illustrates a timing diagram in which the display driving operation and the touch sensing operation are simultaneously performed in the touch display device according to aspects of the present disclosure.

Referring to FIG. 5, the touch display device 100 according to aspects of the present disclosure may simultaneously perform the display driving periods and the touch sensing periods.

Here, the touch sensing periods may be the same as the display driving periods, or may be some periods between the display driving periods. That is, the touch sensing operation may be independently performed, irrespective of the display driving operation, so that the touch sensing operation and the display driving operation may be simultaneously performed.

In a case in which the touch sensing operation is performed simultaneously with the display driving operation, the touch driving signal TDS is supplied to the touch electrodes TE. In addition, the data voltage Vdata may be supplied to the data lines DL for the display driving operation. Also, a gate high voltage VGH and a gate low voltage VGL used for generating the scan signal supplied to the gate lines GL may be supplied.

Here, since the touch driving signal TDS is supplied to the touch electrodes TE in a case in which the common electrode of the touch display panel 110 is used as the touch electrodes TE, so that a voltage difference corresponding to image data may not be generated between the common electrode and the pixel electrodes to which the data voltage Vdata is supplied.

That is, since the voltage of the touch driving signal TDS changes over time, a voltage difference corresponding to the image data may not be formed between the common electrode to which the touch driving signal TDS is supplied and the pixel electrodes. As a result, the subpixels SP may not display luminous intensities corresponding to the image data.

Accordingly, the voltage difference corresponding to the image data may be formed between the common electrode to which the touch driving signal TDS is supplied and the pixel electrodes by supplying the data voltage Vdata modulated on the basis of the touch driving signal TDS to the data lines DL.

The modulation of the data voltage Vdata may be performed by modulating, for example, a gamma voltage used for generating the data voltage Vdata in the data driving circuit 130. Alternatively, it is possible to supply the modulated data voltage Vdata to the data lines DL by modulating the ground voltage in the touch display panel 110.

In addition, the gate lines GL may be driven ordinarily due to the modulated scan signal supplied to the gate lines GL by modulating the gate high voltage VGH and the gate low voltage VGL used for generating the scan signal supplied to the gate lines GL on the basis of the touch driving signal TDS.

As described above, the display driving operation and the touch sensing operation may be simultaneously performed by modulating the data voltage Vdata supplied to the data lines DL or the gate high voltage VGH and the gate low voltage VGL used for generating the scan signal supplied to the gate lines GL on the basis of the touch driving signal TDS.

Figure 6:
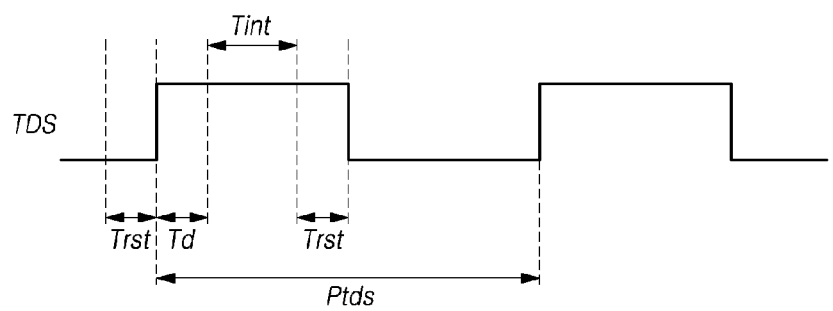
FIG. 6 illustrates a diagram of a touch driving signal supplied to the touch display device.

FIG. 6 illustrates a diagram of a touch driving signal supplied to the touch display device.

Referring to FIG. 6, the touch driving signal TDS supplied to the touch display device 100 may be a pulse signal whose voltage changes over time.

The touch drive signal TDS may include a high level section between a rising edge and a falling edge, and a low level section between a falling edge and a rising edge. When the high level section and the low level section are combined, it may be one period Ptds of the touch drive signal TDS.

In this case, a reset section Trst for initializing the voltage charged in the touch driving circuit 150 may precede before the one period Ptds of the touch driving signal TDS starts.

In addition, a time delay section Td occurs due to an impedance of the touch driving circuit 150 and the display panel 110 between the time when the touch driving signal TDS is supplied from the touch driving circuit 150 to the touch driving electrode and the time when the touch sensing signal is transmitted from the touch sensing electrode to the touch driving circuit 150.

Accordingly, a rest section except for the reset section Trst and the time delay section Td before the touch sensing signal is received in one period Ptds in which the touch driving signal TDS is supplied to the display panel 110 corresponds to an integration section Tint in which the touch driving circuit 150 integrates the touch sensing signal.

For example, when the touch driving signal TDS is supplied at a frequency of 400 KHz, one period Ptds of the touch driving signal TDS is 2.5 us. At this time, the touch driving circuit 150 may perform the touch sensing operation by integrating the touch sensing signal during an integration section Tint of about 0.5 us, except for the time delay section Td of about 0.25 us and the reset section Trst of 0.5 us within a ½ period of 1.25 us.

As described above, since the integration section Tint integrating the touch sensing signal is shortened by the reset section Trst and the time delay section Td for the touch driving signal TDS, the touch sensing quality may be decreased and it is difficult to increase the frequency of the touch driving signal TDS.

The touch display device 100 of the present disclosure may increase the integration section Tint of the touch sensing signal by overlapping the reset section Trst and the time delay section Td for the touch driving signal TDS. As a result, it is possible to improve touch sensing quality and increase the frequency of the touch driving signal TDS.

Figure 7:
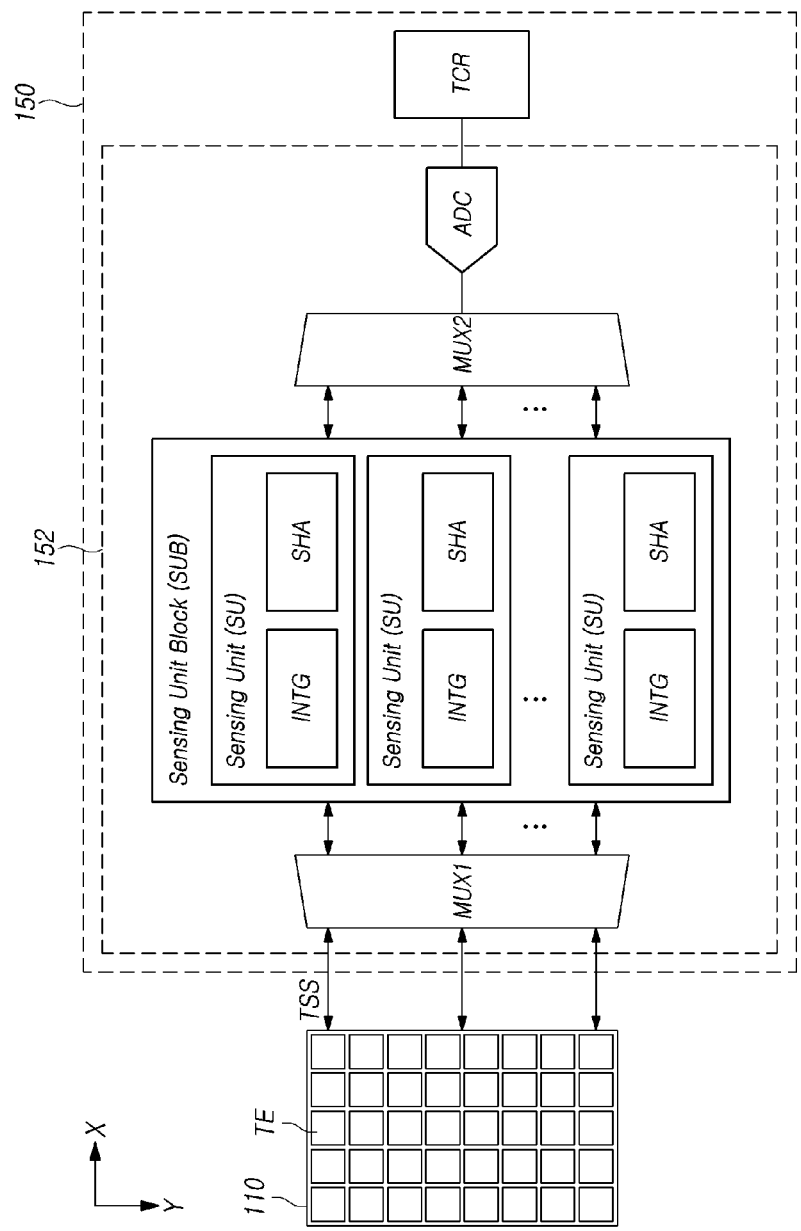
FIG. 7 illustrates a diagram of the touch driving circuit in the touch display device according to aspects of the present disclosure.

FIG. 7 illustrates a diagram of the touch driving circuit in the touch display device according to aspects of the present disclosure.

Referring to FIG. 7, the touch driving circuit 150 according to aspects of the present disclosure may include a touch sensing circuit 152 and a touch controller TCR.

The touch sensing circuit 152 may generate a sensing output signal by driving the display panel 110. For example, the touch sensing circuit 152 may supply a touch driving signal TDS to all or a part of the touch electrodes TE disposed on the display panel 110 and generate the sensing output signal based on a touch sensing signal TSS received from at least one touch electrode TE.

The touch sensing circuit 152 may transmit the sensing output signal or sensing output data obtained by converting the sensing output signal into a digital signal to the touch controller TCR.

The touch controller TCR may acquire a touch presence or touch coordinates by using a sensing output signal or sensing output data supplied from the touch sensing circuit 152. In addition, the touch controller TCR may generate a touch driving signal TDS and transmit it to the touch sensing circuit 152.

In addition, the touch controller TCR may control an operation timing of the touch sensing circuit 152 by transmitting a setting value to the touch sensing circuit 152.

The touch sensing circuit 152 and the touch controller TCR may be implemented separately or may be integrated as one. In particular, when the touch screen panel TSP is embedded in the display panel 110, the touch controller TCR may be integrated into the timing controller 140 and implemented as one.

The touch sensing circuit 152 may include a first multiplexer MUX1, a sensing unit block SUB including a plurality of sensing units SU, a second multiplexer MUX2, and an analog-to-digital converter ADC.

Each of the plurality of sensing units SU generates a sensing output signal using the touch sensing signal TSS received from the touch electrode TE.

The touch sensing signal TSS received from the touch electrode TE varies depending on the touch presence, and the sensing unit SU generates the sensing output signal by amplifying and integrating the difference between the touch driving signal TDS supplied to the touch electrode TE and the touch sensing signals TSS received from the touch electrode TE.

Each of the plurality of sensing units SU may include an integrating circuit INTG and a sample-and-hold circuit SHA. In addition, the plurality of sensing units SU may further include a pre-amplifying circuit in front of the integrating circuit INTG.

One sample-and-hold circuit SHA may be included for each sensing unit SU. Alternatively, one sample-and-hold circuit SHA may be included for each of two or more sensing units SU, and in some cases, one sample-and-hold circuit SHA may be included for all of the plurality of sensing units SU.

The sample-and-hold circuit SHA is a circuit added to the input terminal of the analog-to-digital converter ADC, which samples the voltage of the input signal, and maintains the sampled voltage until the analog-to-digital converter ADC completes the conversion.

That is, the sample-and-hold circuit SHA in the touch sensing circuit 152 is used to maintain the sensing output signal generated from the integrating circuit INTG.

The analog-to-digital converter ADC generates the sensing output data by converting the voltage of the sensing output signal maintained in the sample-and-hold circuit SHA into digital data.

If the touch sensing circuit 152 is configured to output the sensing output signal as it is without converting it to digital data, the sample-and-hold circuit SHA and the analog-to-digital converter ADC may be omitted.

The first multiplexer MUX1 makes it possible to sense a large number of touch electrodes TE even with a small number of sensing units SU. The first multiplexer MUX1 may simultaneously select one or more touch electrodes TE from among the plurality of touch electrodes TE. In addition, the first multiplexer MUX1 transmits the touch driving signal TDS to the selected touch electrode TE, or transmits the touch sensing signal TSS received from the touch electrode TE to selected integrating circuit INTG of the sensing unit SU in the sensing unit block SUB.

The second multiplexer MUX2 selects one of the plurality of sensing units SU and transmits the sensing output signal maintained by the sample-and-hold circuit SHA for the selected sensing unit SU to the analog-to-digital converter ADC.

Meanwhile, the integrating circuit INTG may generate the sensing output signal by amplifying and integrating a difference between the touch sensing signal TSS received from the touch electrode TE and the reference voltage.

Figure 8:
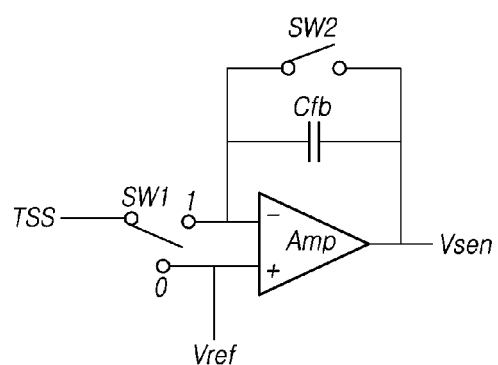
FIG. 8 illustrates a diagram of the integrating circuit constituting the touch driving circuit in a touch display device according to aspects of the present disclosure.

FIG. 8 illustrates a diagram of the integrating circuit constituting the touch driving circuit in a touch display device according to aspects of the present disclosure.

Referring to FIG. 8, the integrating circuit INTG constituting the touch driving circuit 150 in the touch display device 100 according to aspects of the present disclosure may receive the touch sensing signal TSS corresponding to a capacitance formed between the display panel 110 and a finger or a stylus through a first switch SW1.

The first switch SW1 may be connected to an inverting input terminal (−) or a non-inverting input terminal (+) of an operational amplifier Amp according to an operation.

The feedback capacitor Cfb and a second switch SW2 may be connected in parallel between the inverting input terminal (−) and an output terminal of the operational amplifier Amp. The second switch SW2 is a switch to reset the voltage charged in the feedback capacitor Cfb. Accordingly, when the second switch SW2 is turned on, the feedback capacitor Cfb may be reset.

Here, it illustrates a case in which the feedback capacitor Cfb connected in parallel with the second switch SW2 is configured as one, but a plurality of capacitors may be formed in various structures for integrating the touch sensing signal TSS.

A reference voltage Vref for comparing with the touch sensing signal TSS may be supplied to the non-inverting input terminal (+) of the operational amplifier Amp, and the sensing output signal Vsen generated through the integrating circuit INTG is transmitted to the analog-to-digital converter ADC. In this case, the reference voltage Vref supplied to the non-inverting input terminal (+) of the operational amplifier Amp may be a signal having the same phase and amplitude as the touch driving signal TDS.

The touch display device 100 of the present disclosure is driven to overlap a turn-off section of the first switch SW1 for transmitting the touch sensing signal TSS to the operational amplifier Amp and a turn-on section of the second switch SW2 connected to the operational amplifier Amp, instead of separating the reset section Trst and the time delay section Td with respect to the touch driving signal TDS.

Accordingly, in the touch display device 100 of the present disclosure, a time interval of the reset section Trst and the time delay section Td may decrease and a time interval of the integration section Tint for the touch sensing signal TSS may increase since the reset section Trst and the time delay section Td for the touch driving signal TDS are overlapped, thereby increasing the quality of touch sensing.

In addition, a sufficient time interval of the integration section Tint may be secured even if the touch driving signal TDS is supplied at a high frequency since the time interval of the integration section Tint for the touch sensing signal TSS increases.

Figure 9:
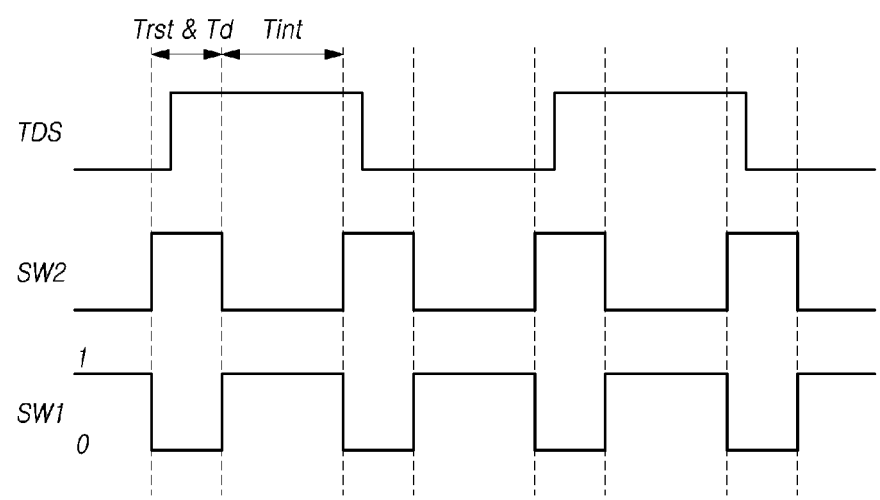
FIG. 9 illustrates a signal diagram for an operation of the integrating circuit in a touch display device according to aspects of the present disclosure.

FIG. 9 illustrates a signal diagram for an operation of the integrating circuit in a touch display device according to aspects of the present disclosure.

Referring to FIG. 9, the touch display device 100 according to aspects of the present disclosure may control the turn-off section of the first switch SW1 for transmitting the touch sensing signal TSS to be overlapped with the turn-on section of the second switch SW2 for resetting the feedback capacitor Cfb by the integrating circuit INTG in the touch driving circuit 150 that generates the sensing output signal Vsen by integrating the touch sensing signal TSS in order to overlap the reset section Trst and the time delay section Td for the touch driving signal TDS. The expression "overlap" means a timely overlap, so that a time duration of the turn-off section of the first switch SW1 overlaps with a time duration of the turn-on section of the second switch SW2.

Here, it illustrates that a case in which the second switch SW2 is connected to reset the feedback capacitor Cfb is expressed as a turn-on state, and a case in which the second switch SW2 is turned off is expressed as a turn-off state. In addition, it illustrates that a case in which the first switch SW1 is connected to the inverting input terminal (−) of the operational amplifier Amp to transmit the touch sensing signal TSS to the touch driving circuit 150 is expressed as a turn-on state, and a case in which the first switch SW1 is connected to the non-inverting input terminal (+) of the operational amplifier Amp to prevent the touch sensing signal TSS from transmitting to the touch driving circuit 150 is expressed as a turn-off state.

In other words, the touch sensing signal TSS to be transmitted to the integrating circuit INTG may be blocked by connecting the first switch SW1 to the non-inverting input terminal (+) of the operational amplifier Amp during the second switch SW2 is turned on to reset the feedback capacitor Cfb.

Accordingly, the reset section Trst for resetting the feedback capacitor Cfb and the time delay section Td for blocking the touch sensing signal TSS to be transmitted to the touch driving circuit 150 are overlapped.

On the other hand, a touch sensing signal TSS may be transmitted to the integrating circuit INTG by connecting the first switch SW1 to the inverting input terminal (−) of the operational amplifier Amp during the second switch SW2 is turned off. In a state in which the second switch SW2 is turned off, a section in which the touch sensing signal TSS is transmitted to the integrating circuit INTG through the first switch SW1 corresponds to the integration section Tint.

For example, when the touch driving signal TDS is supplied at a frequency of 400 KHz, one period Ptds of the touch driving signal TDS is 2.5 us. At this time, the touch driving circuit 150 may perform the touch sensing operation by integrating the touch sensing signal TSS during an integration section Tint of about 0.75 us by overlapping the reset section Trst and the time delay section Td for a time of about 0.5 us within a ½ period of 1.25 us.

At this time, the reset section Trst and the time delay section Td may be synchronous to a rising edge that the touch driving signal TDS changes from a low level to a high level and a falling edge that the touch driving signal TDS changes from a high level to a low level, or include the rising edge and the falling edge in order to reduce noise generated during a transition of the touch driving signal TDS. Here, it illustrates, as an example, a case that the reset section Trst and the time delay section Td include the rising edge that the touch driving signal TDS changes from a low level to a high level and the falling edge that the touch driving signal TDS changes from a high level to a low level.

Here, it illustrates a case in which the reset section Trst for resetting the feedback capacitor Cfb and the time delay section Td for blocking the touch sensing signal TSS to be transmitted to the touch driving circuit 150 are the same. That is, it illustrates a case, as an example, in which the time interval between the turn-off section of the first switch SW1 for transmitting the touch sensing signal TSS and the turn-on section of the second switch SW2 for resetting the feedback capacitor Cfb are the same.

However, the time interval between the turn-off section of the first switch SW1 for transmitting the touch sensing signal TSS and the turn-on section of the second switch SW2 for resetting the feedback capacitor Cfb may be different. In this case, a part of the time intervals may overlap between the turn-off section of the first switch SW1 and the turn-on section of the second switch SW2.

In above, it illustrated a case that the first switch SW1 is connected to the non-inverting input terminal (+) of the operational amplifier Amp in order to reset the feedback capacitor Cfb of the integrating circuit INTG during the reset section Trst in which the second switch SW2 is turned on. However, the first switch SW1 may not be connected to the non-inverting input terminal (+) of the operational amplifier Amp and may be maintained at a turn-off state during the reset section Trst in which the second switch SW2 is turned on.

Figure 10:
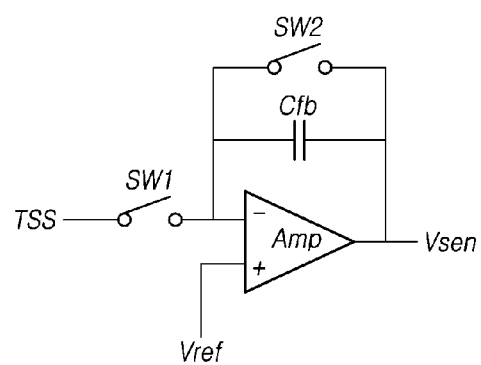
FIG. 10 illustrates a circuit diagram as another example of the integrating circuit constituting the touch driving circuit in the touch display device according to aspects of the present disclosure.

FIG. 10 illustrates a circuit diagram as another example of the integrating circuit constituting the touch driving circuit in the touch display device according to aspects of the present disclosure.

Referring to FIG. 10, the integrating circuit INTG constituting the touch driving circuit 150 in the touch display device 100 according to aspects of the present disclosure may receive the touch sensing signal TSS corresponding to the capacitance formed between the display panel 110 and a finger or a stylus through the first switch SW1.

The first switch SW1 may be in a turn-on state connected to the inverting input terminal (−) of the operational amplifier Amp or in a turn-on state that is not connected to the inverting input terminal (−) of the operational amplifier Amp.

The feedback capacitor Cfb and the second switch SW2 may be connected in parallel between the inverting input terminal (−) and the output terminal of the operational amplifier Amp. The second switch SW2 corresponds to a switch for resetting the feedback capacitor Cfb. Accordingly, when the second switch SW2 is turned on, the feedback capacitor Cfb may be reset.

A reference voltage Vref for comparing with the touch sensing signal TSS is supplied to the non-inverting input terminal (+) of the operational amplifier Amp, and the sensing output signal Vsen generated through the integrating circuit INTG is transmitted to an analog-to-digital converter ADC.

The touch display device 100 of the present disclosure turns on and turns off the first switch SW1 for transmitting the touch sensing signal TSS to the operational amplifier Amp and the second switch SW2 connected to the operational amplifier Amp at the same time.

In other words, the touch sensing signal TSS may be blocked by turning off the first switch SW1 from the inverting input terminal (−) of the operational amplifier Amp during the second switch SW2 is turned on to reset the feedback capacitor Cfb. Accordingly, the reset section Trst for resetting the feedback capacitor Cfb and the time delay section Td for blocking the touch sensing signal TSS to be transmitted to the touch driving circuit 150 are overlapped.

On the other hand, the touch sensing signal TSS may be transmitted to the integrating circuit INTG by connecting the first switch SW1 to the inverting input terminal (−) of the operational amplifier Amp during the second switch SW2 is turned off In a state in which the second switch SW2 is turned off, a period in which the touch sensing signal TSS is transmitted to the integrating circuit INTG through the first switch SW1 corresponds to the integration section Tint.

Accordingly, the time interval between the reset section Trst and the time delay section Td may be reduced since the reset section Trst and the time delay section Td for the touch driving signal TDS are overlapped. On the other hand, the quality of touch sensing may be increased since the time interval of the integration section Tint for the touch sensing signal TSS increases.

In addition, it is possible to secure a sufficient time interval of the integration section Tint even if the touch driving signal TDS is supplied at a high frequency since the time interval of the integration section Tint for the touch sensing signal TSS increases.

Figure 11:
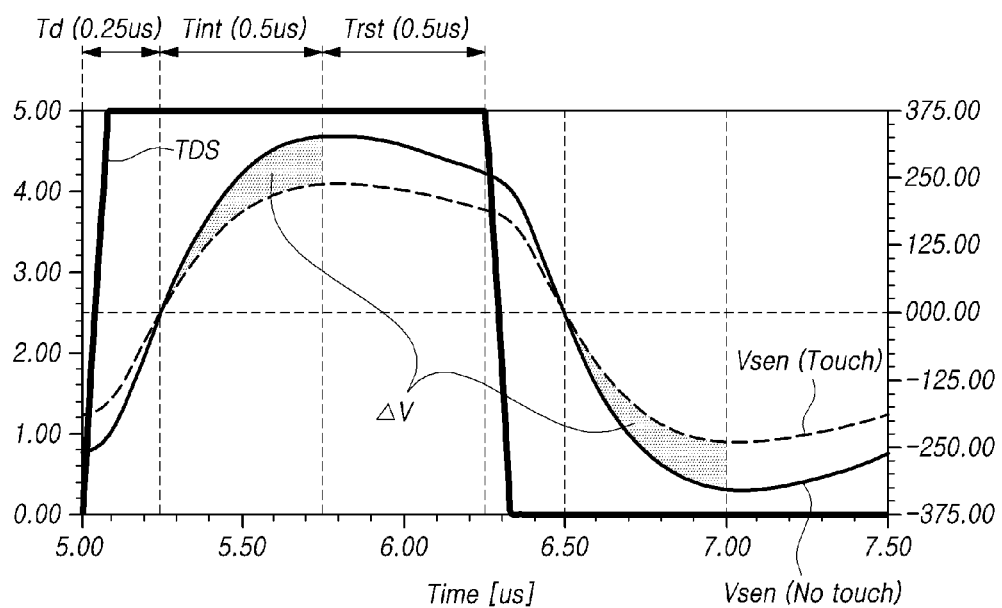
FIG. 11 and FIG. 12 illustrate signal diagrams when a reset section and a time delay section for the touch driving signal are separated and overlapped in the touch display device according to aspects of the present disclosure.
Figure 12:
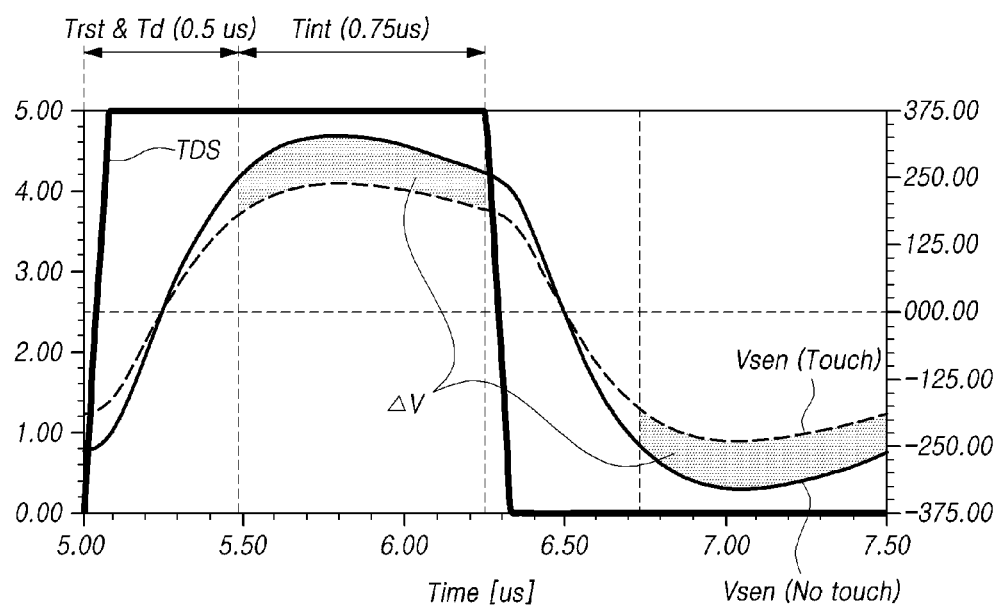

FIG. 11 and FIG. 12 illustrate signal diagrams when a reset section and a time delay section for the touch driving signal are separated and overlapped in the touch display device according to aspects of the present disclosure.

Referring to FIG. 12, a reset section Trst for initializing the voltage charged in the touch driving circuit 150 precede before the one period Ptds of the touch driving signal TDS starts. And then, the time delay section Td proceeds from a time when the touch driving signal TDS is supplied to the time when the touch sensing signal TSS is received. Therefore, the integration section Tint for integrating the touch sensing signal may be a rest section except for the reset section Trst and the time delay section Td within one period Ptds.

For example, when the touch driving signal TDS is supplied at a frequency of 400 KHz, one period Ptds of the touch driving signal TDS is 2.5 us. At this time, the touch driving circuit 150 may have the integration section Tint of about 0.5 us, except for the time delay section Td of about 0.25 us and the reset section Trst of 0.5 us within a ½ period of 1.25 us.

In this case, the touch driving circuit 150 may generate the sensing output signal Vsen by integrating the touch sensing signal TSS within the integration section Tint of 0.5 us. Accordingly, the touch driving circuit 150 may determine a presence of touch by comparing a difference voltage ΔV between a first sensing output signal Vsen(Touch) of a touch electrode in which the touch sensing signal TSS is generated and a second sensing output signal Vsen(No touch) of untouched touch electrode in which the touch sensing signal TSS is not generated within the integration section Tint of 0.5 us.

On the other hand, as shown in FIG. 12, the reset section Trst for resetting the feedback capacitor Cfb of the integrating circuit INTG and the time delay section Td for blocking the touch sensing signal TSS to be transmitted to the touch driving circuit 150 may proceed in the same time period when the reset section Trst and the time delay section Td for the touch driving signal TDS are overlapped.

The touch sensing signal TSS may be transmitted to the integrating circuit INTG by connection the first switch SW1 to the inverting input terminal (−) of the operational amplifier Amp during the second switch SW2 constituting the integrating circuit INTG is turned off In this case, a section in which the touch sensing signal TSS is transmitted to the integrating circuit INTG through the first switch SW1 while the second switch SW2 is turned off corresponds to the integration section Tint.

For example, when the touch driving signal TDS is supplied at a frequency of 400 KHz, one period Ptds of the touch driving signal TDS is 2.5 us. At this time, the touch driving circuit 150 may perform the touch sensing operation by integrating the touch sensing signal TSS during the integration section Tint of about 0.75 us by overlapping the reset section Trst and the time delay section Td for a time of about 0.5 us within a ½ period of 1.25 us.

Accordingly, the touch driving circuit 150 may generate the sensing output signal Vsen by integrating the touch sensing signal TSS within the integration section Tint of 0.75 us. Therefore, the touch driving circuit 150 may determine a presence of touch by comparing a difference voltage ΔV between a first sensing output signal Vsen(Touch) of a touch electrode in which the touch sensing signal TSS is generated and a second sensing output signal Vsen(No touch) of untouched touch electrode in which the touch sensing signal TSS is not generated within the integration section Tint of 0.75 us.

As a result, a time interval of the integration section Tint for the touch sensing signal TSS increases while a time interval of the reset section Trst and the time delay section Td for the touch driving signal TDS decreases by overlapping the reset section Trst and the time delay section Td for the touch driving signal TDS, thereby increasing the quality of touch sensing.

Figure 13:
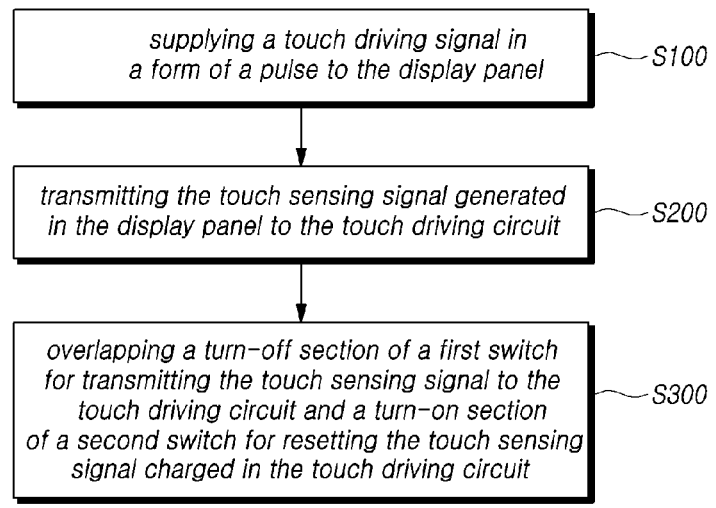
FIG. 13 illustrates a schematic flowchart for a driving method of a touch display device according to aspects of the present disclosure.

FIG. 13 illustrates a schematic flowchart for a driving method of a touch display device according to aspects of the present disclosure.

Referring to FIG. 13, the driving method of the touch display device 100 according to aspects of the present disclosure may include a step S100 of supplying a touch driving signal TDS in a form of a pulse to the display panel 110, a step S200 of transmitting the touch sensing signal TSS generated in the display panel 110 to the touch driving circuit 150, and a step S300 of overlapping a turn-off section of a first switch SW1 for transmitting the touch sensing signal TSS to the touch driving circuit 150 and a turn-on section of a second switch SW2 for resetting the touch sensing signal TSS charged in the touch driving circuit 150.

The step S100 of supplying a touch driving signal TDS in a form of a pulse to the display panel 110 is a process of supplying the touch driving signal TDS in a form of pule to sense a touch for the display panel 110 on which the plurality of touch electrodes TE are disposed.

The step S200 of transmitting the touch sensing signal TSS generated in the display panel 110 to the touch driving circuit 150 is a process of transmitting the touch sensing signal TSS received from a touch electrode TE to which the touch driving signal TDS is supplied to the touch driving circuit 150.

In this case, a section in which the touch sensing signal TSS is transmitted to the touch driving circuit 150 may be a section in which the first switch SW1 for connecting the sensing line SL and the touch driving circuit 150 is connected to the inverting input terminal (−) of the integrating circuit INTG constituting the touch driving circuit 150. In addition, a section in which a voltage is charged in the feedback capacitor Cfb by connecting the first switch SW1 to the inverting input terminal (−) of the integrating circuit INTG constituting the touch driving circuit 150 may be the integration section Tint for generating the sensing output signal Vsen by integrating the touch sensing signal TSS.

At this time, the first switch SW1 for connecting the sensing line SL and the touch driving circuit 150 is disconnected from the inverting input terminal (−) of the integrating circuit INTG during the reset section Trst for initializing the voltage charged in the touch driving circuit 150 and the time delay section Td from a time when the touch driving signal TDS is supplied to a time when the touch sensing signal is received.

The step S300 of overlapping a turn-off section of a first switch SW1 for transmitting the touch sensing signal TSS to the touch driving circuit 150 and a turn-on section of a second switch SW2 for resetting the touch sensing signal TSS charged in the touch driving circuit 150 is a process of reducing a time interval occupied by the reset section Trst and the time delay section Td, and increasing a time interval of the integration section Tint for the touch sensing signal TSS by overlapping the reset section Trst and the time delay section Td.

Accordingly, a time interval of the reset section Trst and the time delay section Td may decrease and a time interval of the integration section Tint for the touch sensing signal TSS may increase since the reset section Trst and the time delay section Td for the touch driving signal TDS are overlapped, thereby increasing the quality of touch sensing.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A touch display device comprising:
a display panel in which a plurality of touch electrodes including a plurality of X-touch electrodes extending to a first direction and a plurality of Y-touch electrodes extending to a second direction, and a plurality of subpixels are disposed;
a touch driving circuit supplying a touch driving signal to the display panel, sensing a touch by detecting a touch sensing signal, and overlapping with a turn-off section of a first switch transmitting the touch sensing signal and a turn-on section of a second switch resetting the touch sensing signal transmitted through the first switch; and
an integrating circuit for generating a sensing output signal,
wherein the touch driving circuit includes an operational amplifier including an inverting input terminal and a non-inverting input terminal to which a reference voltage is supplied,
wherein the first switch is connected to the inverting input terminal or the non-inverting input terminal of the operational amplifier according to a turn-on or turn-off operation of the second switch.

2. The touch display device according to claim 1, wherein the touch driving circuit includes:
a sample-and-hold circuit sampling the sensing output signal of the integrating circuit and maintaining the sampled voltage,
wherein the integrating circuit generates the sensing output signal by integrating a difference between the touch sensing signal and a reference voltage.

3. The touch display device according to claim 2, wherein the integrating circuit includes:

a feedback capacitor connected between the inverting input terminal and an output terminal of the operational amplifier and connected in parallel with the second switch.

4. The touch display device according to claim 1, wherein the first switch is connected to the inverting input terminal of the operational amplifier during the turn-on section of the second switch.

5. The touch display device according to claim 4, wherein a section in which the first switch is connected to the inverting input terminal of the operational amplifier and the second switch is turned on includes a reset section of the integrating circuit and a time delay section in which the touch sensing signal is received according to the touch driving signal.

6. The touch display device according to claim 1, wherein the first switch is disconnected to the non-inverting input terminal of the operational amplifier during the second switch is turned on.

7. The touch display device according to claim 6, wherein a section in which the first switch is disconnected from the non-inverting input terminal of the operational amplifier and the second switch is turned on includes a reset section of the integrating circuit and a time delay section in which the touch sensing signal is received according to the touch driving signal.

8. The touch display device according to claim 1, wherein a time interval of the turn-off section of the first switch is different from a time interval of the turn-on section of the second switch, and the turn-off section of the first switch is overlapped with a part of the turn-on section of the second switch.

9. A driving circuit of a touch display device for sensing a touch by supplying a touch driving signal to a display panel and detecting a touch sensing signal, comprising:
a first switch transmitting the touch sensing signal;
an integrating circuit generating a sensing output signal by integrating a difference between the touch sensing signal and a reference voltage;
a sample-and-hold circuit sampling the sensing output signal of the integrating circuit and maintaining the sampled voltage; and
an operational amplifier including an inverting input terminal and a non-inverting input terminal to which a reference voltage is supplied,
wherein a turn-on section of a second switch resetting the integrating circuit overlaps with a turn-off section of the first switch,
wherein the first switch is connected to the inverting input terminal or the non-inverting input terminal of the operational amplifier according to a turn-on or turn-off operation of the second switch.

10. The driving circuit according to claim 9, wherein the integrating circuit includes:
a feedback capacitor connected between the inverting input terminal and an output terminal of the operational amplifier and connected in parallel with the second switch.

11. The driving circuit according to claim 9, wherein the first switch is connected to the inverting input terminal of the operational amplifier during the turn-on section of the second switch.

12. The driving circuit according to claim 9, wherein the first switch is disconnected to the non-inverting input terminal of the operational amplifier during the second switch is turned on.

13. The driving circuit according to claim 9, wherein a time interval of the turn-off section of the first switch is different from a time interval of the turn-on section of the second switch, and the turn-off section of the first switch is overlapped with a part of the turn-on section of the second switch.

14. A driving method of a touch display device including a display panel in which a plurality of touch electrodes comprised of a plurality of X-touch electrodes extending to a first direction and a plurality of Y-touch electrodes extending to a second direction, and a plurality of subpixels are disposed, and a touch driving circuit supplying a touch driving signal to the display panel and sensing a touch by detecting a touch sensing signal, and including an integrating circuit that generates a sensing output signal and includes an operational amplifier including an inverting input terminal and a non-inverting input terminal to which a reference voltage is supplied, comprising:
supplying a touch driving signal in a form of a pulse to the display panel;
transmitting the touch sensing signal generated in the display panel to the touch driving circuit; and
overlapping with a turn-off section of a first switch for transmitting the touch sensing signal to the touch driving circuit and a turn-on section of a second switch resetting the touch sensing signal charged in the touch driving circuit,
wherein the first switch is connected to the inverting input terminal or the non-inverting input terminal of the operational amplifier according to a turn-on or turn-off operation of the second switch.

15. The driving method of the touch display device according to claim 14, wherein a time interval of the turn-off section of the first switch is different from a time interval of the turn-on section of the second switch, and the turn-off section of the first switch overlaps with a part of the turn-on section of the second switch.

* * * * *